US008418474B2

(12) United States Patent

Rizkalla et al.

(10) Patent No.: US 8,418,474 B2

(45) Date of Patent: *Apr. 16, 2013

(54) ALTERING A NATURAL FREQUENCY OF A GAS TURBINE TRANSITION DUCT

(75) Inventors: Hany Rizkalla, Stuart, FL (US); Stephen W. Jorgensen, Palm City, FL (US); Peter Stuttaford, Jupiter, FL (US)

(73) Assignee: Alstom Technology Ltd., Baden (CH)

( * ) Notice: Subject to any disclaimer, the term of this patent is extended or adjusted under 35 U.S.C. 154(b) by 960 days.

This patent is subject to a terminal disclaimer.

(21) Appl. No.: 12/240,380

(22) Filed: Sep. 29, 2008

(65) Prior Publication Data

US 2009/0188258 A1 Jul. 30, 2009

Related U.S. Application Data

(60) Provisional application No. 61/024,315, filed on Jan. 29, 2008.

(51) Int. Cl.

| | |
|---|---|
| ***F02C 7/20*** | (2006.01) |
| ***F02C 1/00*** | (2006.01) |
| ***F02G 3/00*** | (2006.01) |

(52) U.S. Cl.

USPC .................. 60/796; 60/799; 60/800; 60/797; 60/798; 60/752

(58) Field of Classification Search .................... 60/796, 60/799, 800, 752, 39.37, 797, 798

See application file for complete search history.

(56) References Cited

U.S. PATENT DOCUMENTS

| | | | | |
|---|---|---|---|---|
| 3,759,038 | A * | 9/1973 | Scalzo et al. | 60/800 |
| 4,297,843 | A * | 11/1981 | Sato et al. | 60/796 |
| 4,422,288 | A * | 12/1983 | Steber | 60/800 |
| 4,719,748 | A * | 1/1988 | Davis et al. | 60/39.37 |
| 4,849,665 | A * | 7/1989 | Kitamura et al. | 310/68 D |
| 5,414,999 | A | 5/1995 | Barnes | |
| 5,572,863 | A | 11/1996 | Wrightham | |
| 5,761,898 | A * | 6/1998 | Barnes et al. | 60/799 |
| 6,442,946 | B1 | 9/2002 | Kraft | |
| 6,450,762 | B1 * | 9/2002 | Munshi | 415/138 |
| 6,484,505 | B1 * | 11/2002 | Brown et al. | 60/760 |
| 6,568,187 | B1 * | 5/2003 | Jorgensen et al. | 60/752 |
| 6,619,915 | B1 * | 9/2003 | Jorgensen | 415/138 |
| 6,662,567 | B1 | 12/2003 | Jorgensen | |
| 6,675,584 | B1 * | 1/2004 | Hollis et al. | 60/796 |
| 7,377,117 | B2 * | 5/2008 | Riggi et al. | 60/796 |
| 7,527,469 | B2 * | 5/2009 | Zborovsky et al. | 415/9 |
| 7,584,620 | B2 * | 9/2009 | Weaver et al. | 60/796 |
| 7,784,264 | B2 * | 8/2010 | Weaver et al. | 60/39.37 |
| 8,322,146 | B2 * | 12/2012 | Rizkalla et al. | 60/796 |
| 2007/0069434 | A1 * | 3/2007 | Kato et al. | 267/141.1 |

* cited by examiner

*Primary Examiner* — William H Rodriguez
*Assistant Examiner* — Carlos A Rivera

(57) ABSTRACT

A transition duct having a thermally free aft frame and being capable of adjusting the natural frequency is disclosed. The aft frame is capable of permitting movement due to thermal gradients with the transition duct. The transition duct utilizes a spring plate located adjacent to an aft mounting bracket, where the spring plate, based on its thickness can either increase or decrease a frequency of the transition duct. Such an arrangement ensures that the transition duct natural frequency does not coincide with or cross other critical engine and/or combustor frequencies.

14 Claims, 12 Drawing Sheets

ALTERING A NATURAL FREQUENCY OF A GAS TURBINE TRANSITION DUCT

CROSS-REFERENCE TO RELATED APPLICATIONS

This patent application claims priority to U.S. Provisional Patent Application Ser. No. 61/024,315 filed on Jan. 29, 2008.

TECHNICAL FIELD

The present invention relates to gas turbine engines. More particularly, embodiments of the present invention relate to an apparatus and method for altering the natural frequencies of a transition duct.

BACKGROUND OF THE INVENTION

Gas turbine engines operate to produce mechanical work or thrust. One type of gas turbine engine is a land-based engine that has a generator coupled thereto which harnesses the mechanical work for the purposes of generating electricity. A gas turbine engine comprises at least a compressor section having a series of rotating compressor blades. Air enters the engine through an inlet and then passes through the compressor, where the rotating blades compress the air and raise its pressure. The compressed air is then directed into one or more combustors where fuel is injected into the compressed air and the mixture is ignited. The hot combustion gases are then directed from the combustion section to a turbine section by a transition duct. Depending on the geometry of the gas turbine engine, often times the combustion section is located radially outward of the inlet to the turbine section, and therefore the transition duct must change in radial profile. However, a change in geometry for the transition duct, which is operating at extremely high temperatures, can create high thermal and mechanical stresses in the transition duct.

By nature, the transition duct has a series of natural operating frequencies and bending modes. The gas turbine engine and combustion system also have a natural frequency, and orders of the natural frequency (i.e. 1E, 2E, 3E, etc). When a component, such as a transition duct, has a natural frequency or mode that coincides with or approaches an engine natural frequency or order thereof, the component can become dynamically excited. If care is not taken to avoid the crossings of these frequencies, operating at these frequencies, or minimizing the time for the crossing, the component may experience excessive wear or failure due to the vibratory stress that occurs when operating at or near the natural frequency of the gas turbine engine or combustion system.

SUMMARY

Embodiments of the present invention are directed towards a system and method for, among other things, providing a way of altering a natural frequency of a transition duct such that the natural frequency is outside of other frequencies of at least the combustion system or order thereof. The natural frequency can be altered by incorporating a spring plate of various thicknesses into the transition duct.

The present invention also provides an embodiment directed towards a system and method for compensating for thermal and mechanical stresses that are imparted into the transition duct while also providing structural support against pressure loads applied to the transition duct.

Additional advantages and features of the present invention will be set forth in part in a description which follows, and in part will become apparent to those skilled in the art upon examination of the following, or may be learned from practice of the invention.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

Figure 1:
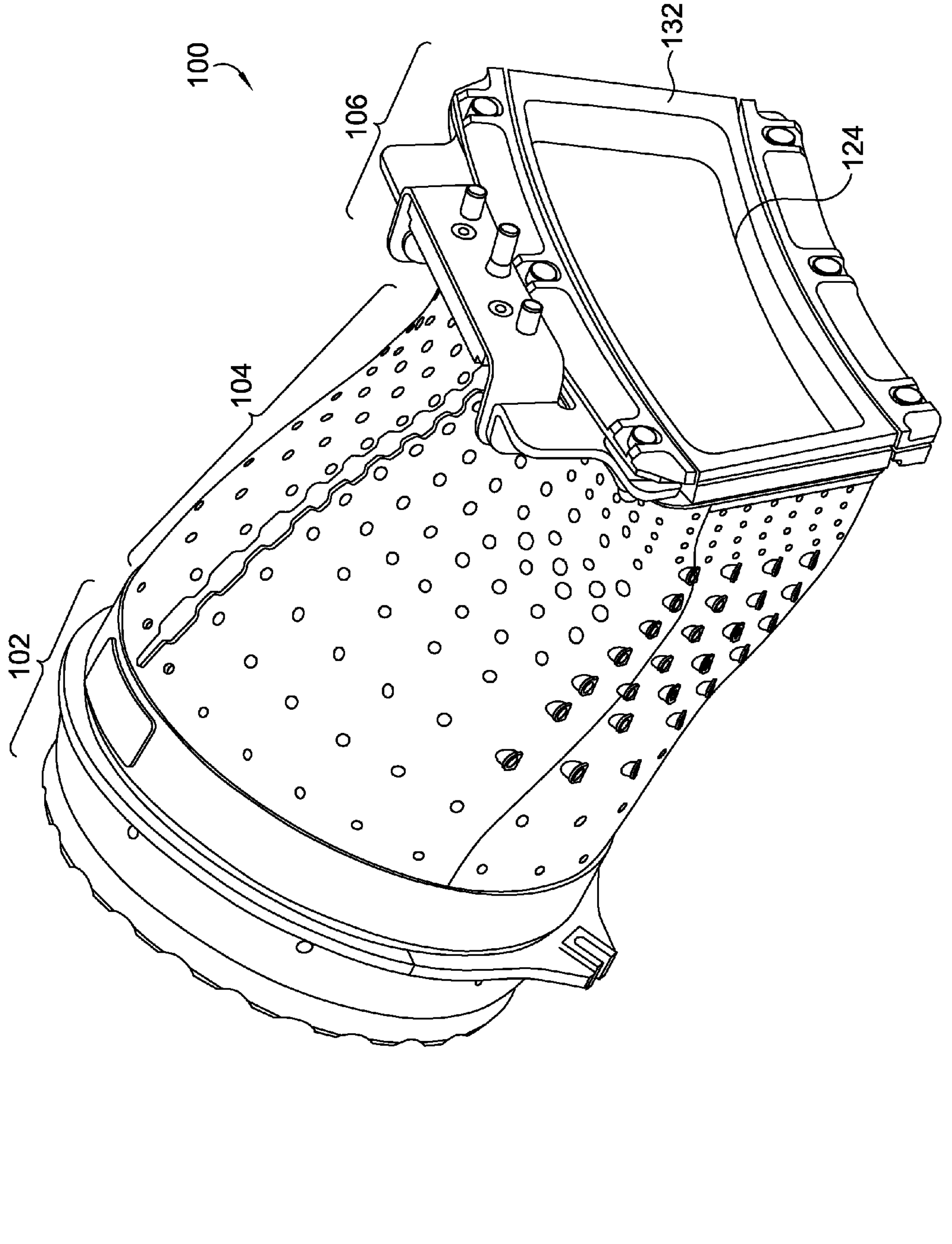
FIG. 1 depicts a perspective view of a transition duct in accordance with an embodiment of the present invention.
Figure 2:
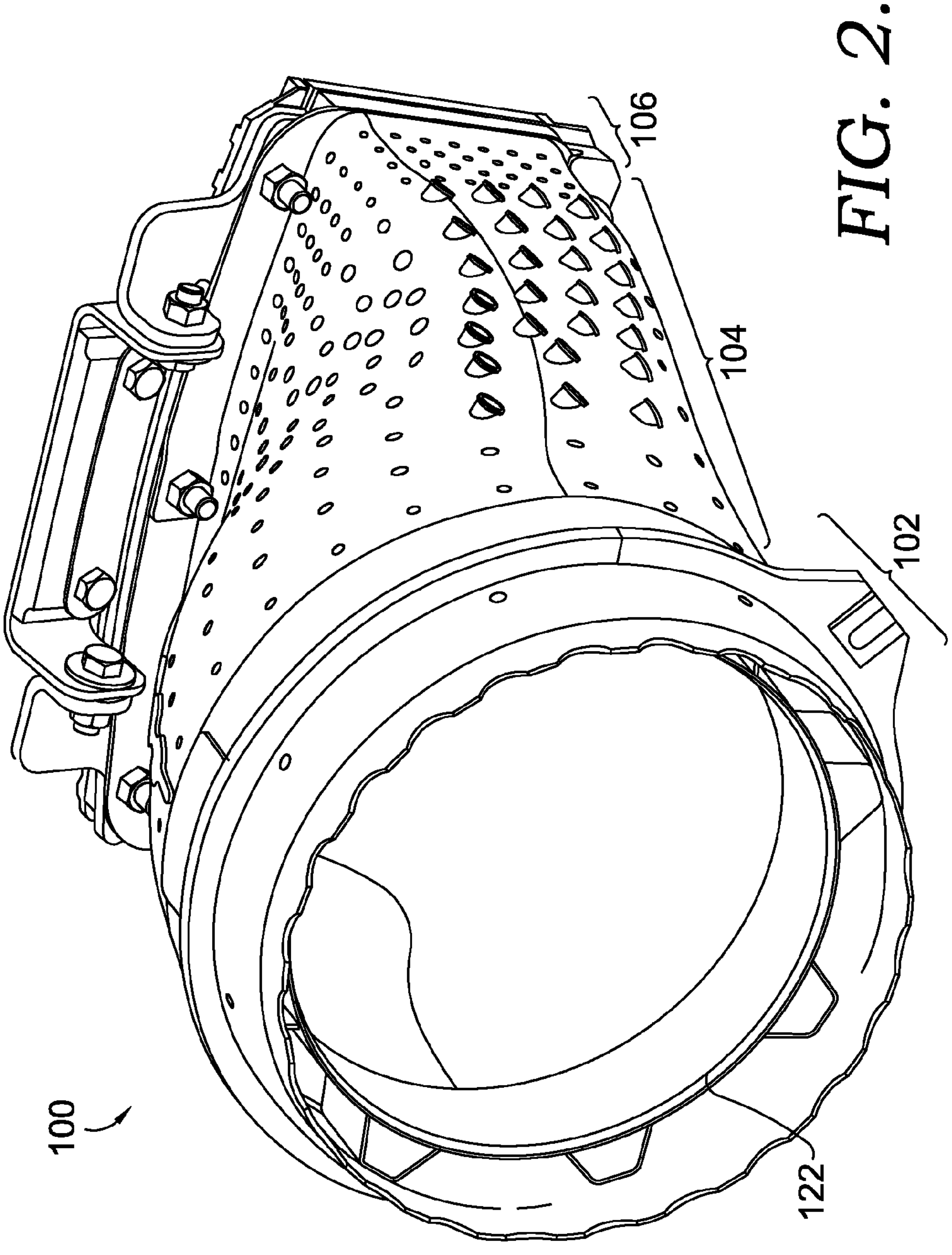
FIG. 2 depicts an alternate perspective view of the transition duct of FIG. 1 in accordance with an embodiment of the present invention.
Figure 3:
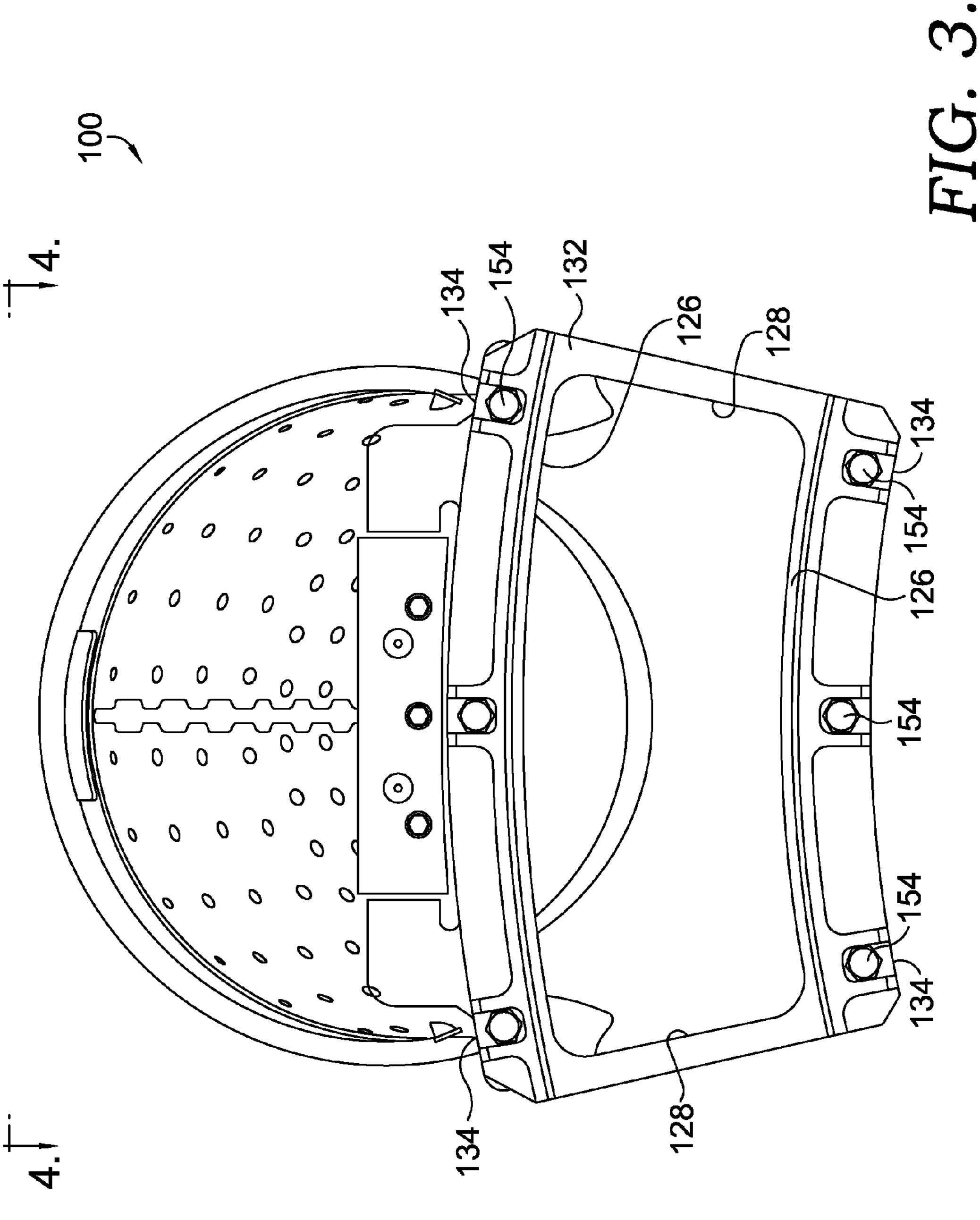
FIG. 3 depicts an elevation view of the transition duct of FIGS. 1 and 2 looking forward from an outlet of the transition duct in accordance with an embodiment of the present invention.
Figure 4:
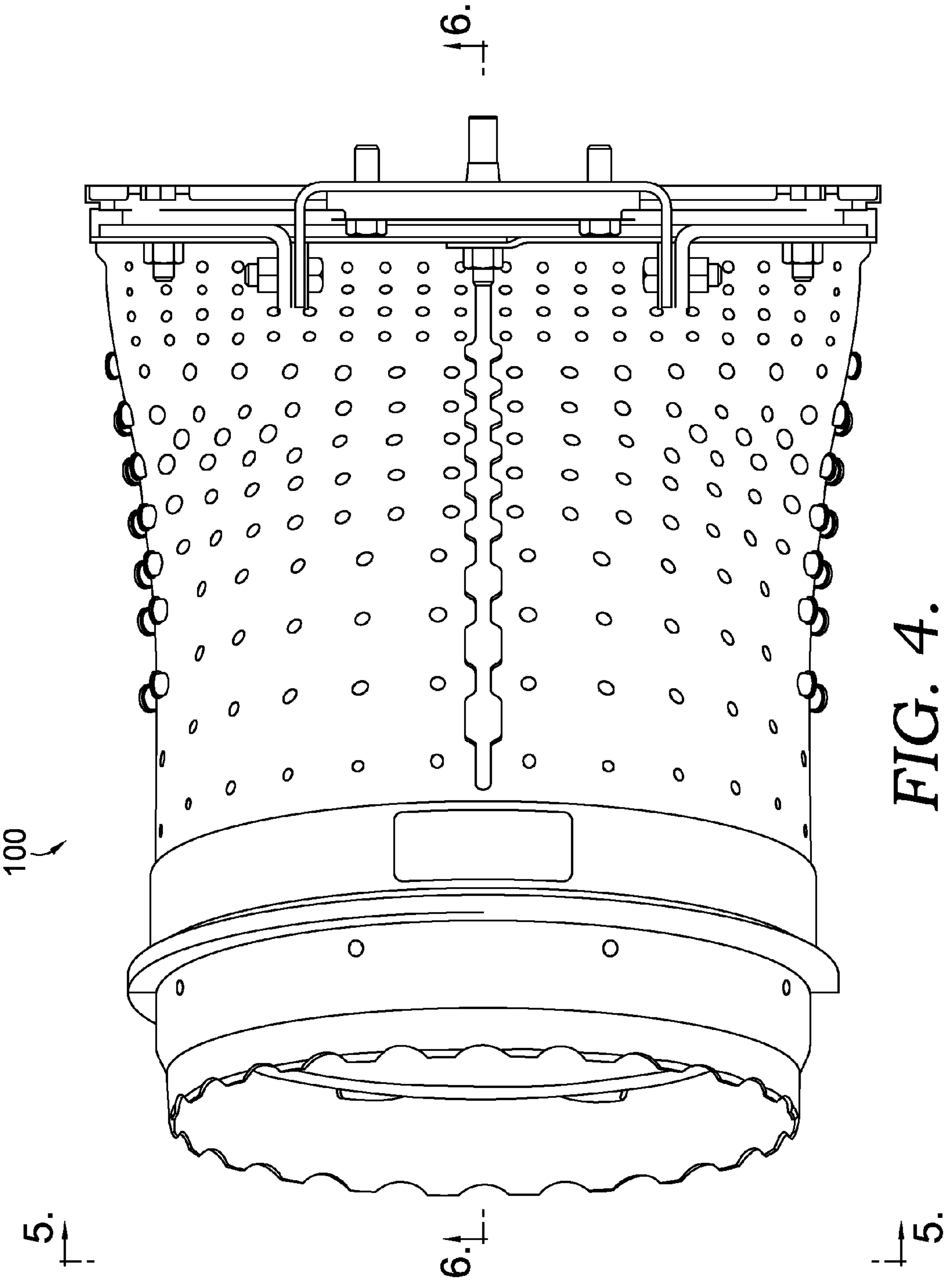
FIG. 4 depicts a top view of the transition duct of FIGS. 1 and 2 in accordance with an embodiment of the present invention
Figure 5:
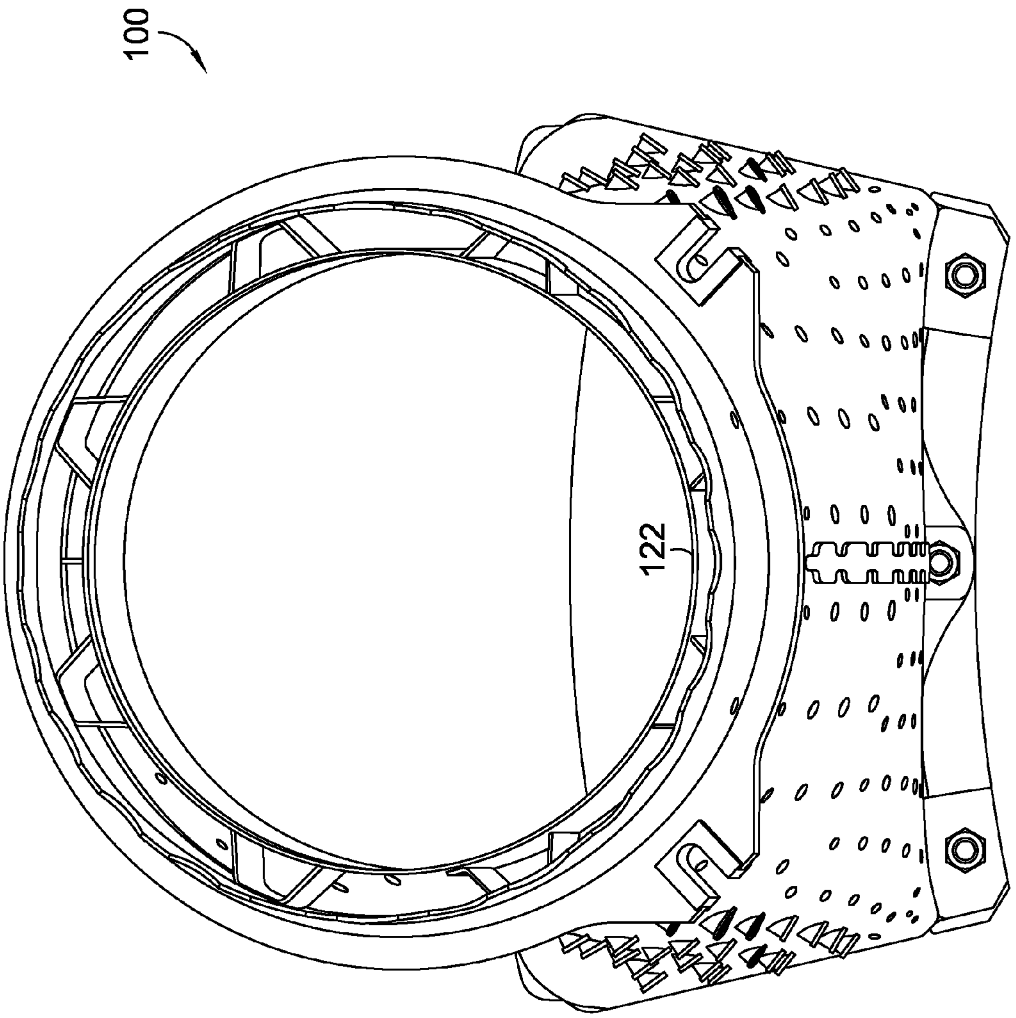
FIG. 5 depicts an elevation view of the transition duct of FIGS. 1 and 2 looking aft from an inlet of the transition duct in accordance with an embodiment of the present invention.

The present invention will now be described with reference to the accompanying FIGS. 1-13B. Referring initially to FIGS. 1 and 2, a transition duct 100 in accordance with an embodiment of the present invention is shown. The transition duct 100 includes a generally cylindrical inlet region 102, a panel assembly region 104, and an aft frame region 106. Elevation views of an embodiment of the present invention are shown in FIGS. 3-5. Specifically, FIG. 3 shows a view from an outlet end of the transition duct 100 looking forward towards an inlet end, FIG. 4 shows a top view of the transition duct 100, and FIG. 5 shows a view from the inlet end of the transition duct 100 looking aft towards the outlet. As it can be seen from FIG. 7, a combustion liner 300 inserts into the transition duct 100 at the inlet end, while the aft end of the transition duct 100 mates to a turbine vane ring 200.

Figure 6:
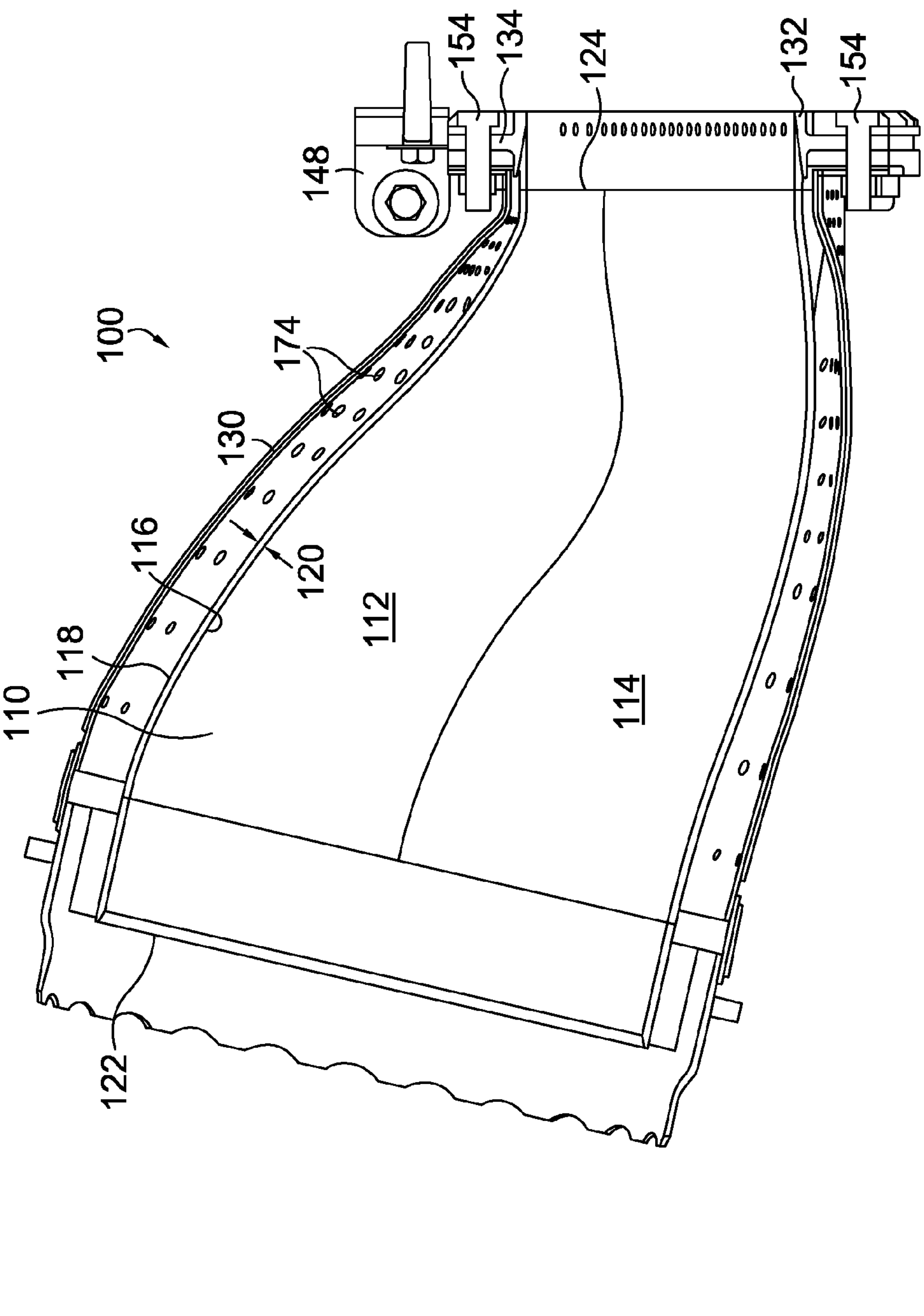
FIG. 6 depicts a cross section view of a transition duct of FIGS. 1 and 2 in accordance with an embodiment of the present invention.

Referring now to FIG. 6, which is a cross section of the transition duct 100, further details of the present invention can be seen. The transition duct 100 comprises a first panel assembly 110 having a first inner panel 112 fixed to a second inner panel 114, such that the transition duct 100 has a first inner surface 116, a first outer surface 118, and a first thickness 120 therebetween. The transition duct 100 also comprises a first generally cylindrical inlet end 122 and a first generally rectangular exit end 124, proximate the outlet of the transition duct 100. The exit end 124, as is better depicted in FIG. 3, is defined by a pair of arcs 126 of different diameters that are concentric about a center and are connected by a pair of radial lines 128 that extend from a center.

For the embodiment of the present invention depicted in the FIGS., the first panel assembly 110 may be surrounded by a second panel assembly 130. Features of the second panel assembly 130 will be discussed in more detail below.

Figure 9:
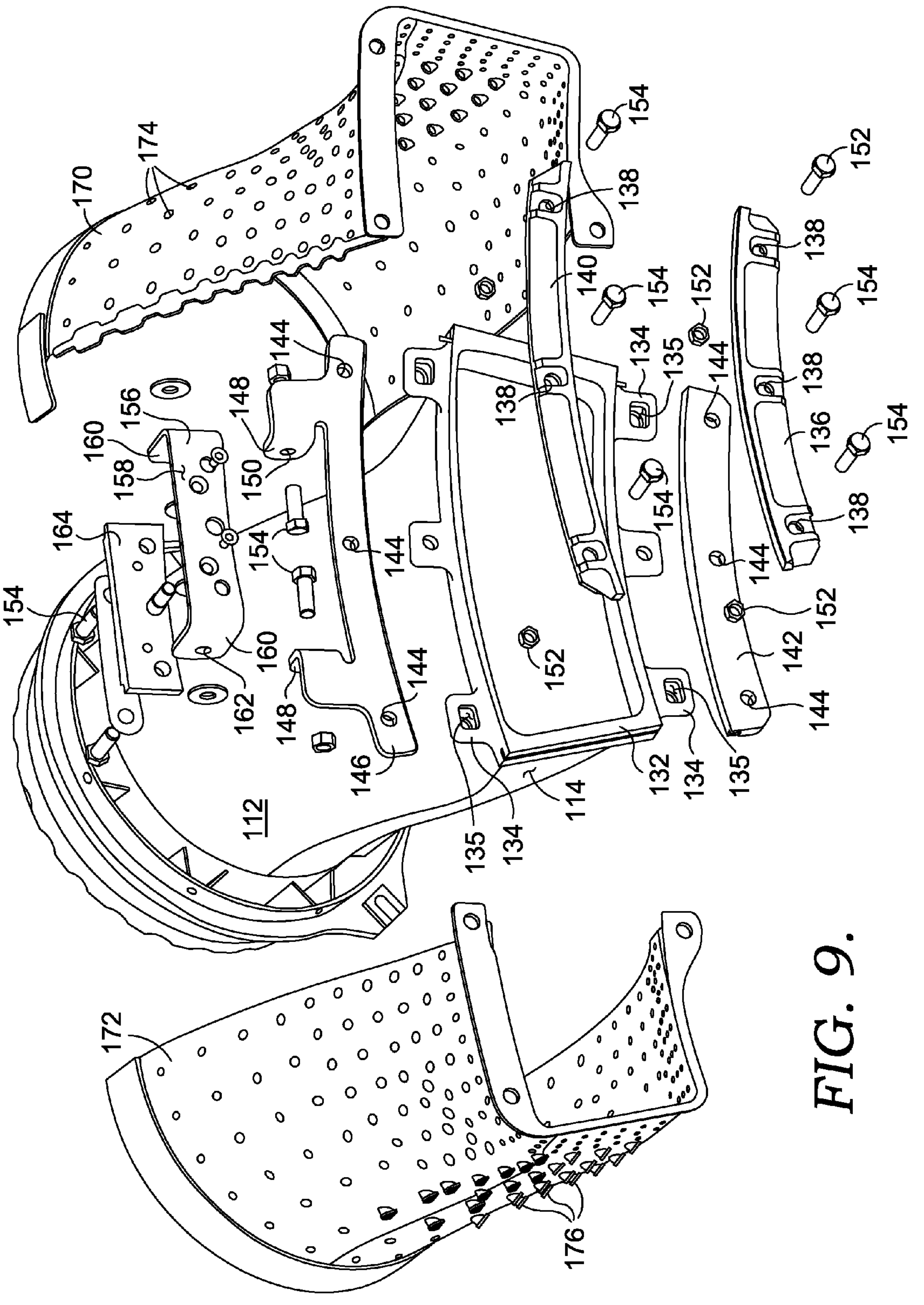
FIG. 9 depicts an exploded view of a transition duct in accordance with an embodiment of the present invention.
Figure 10:
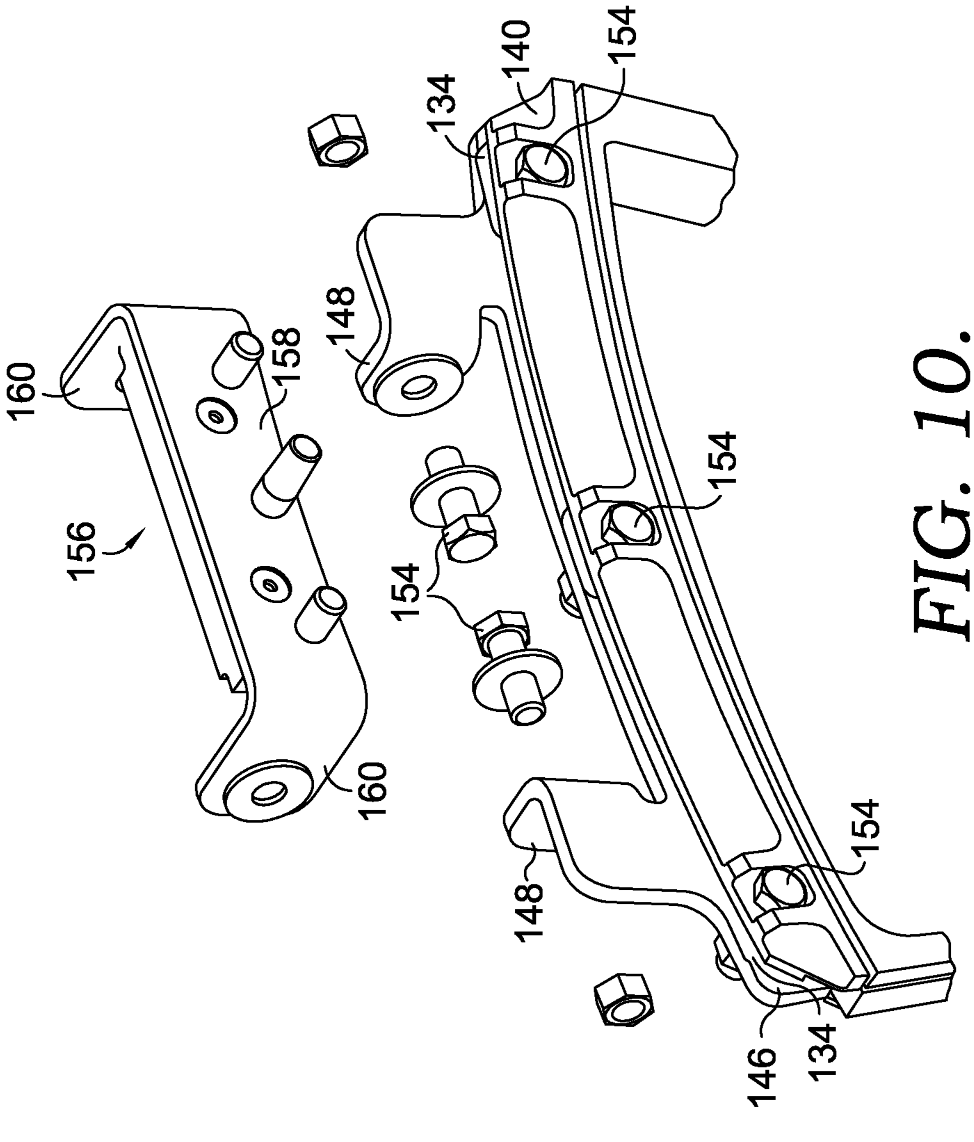
FIG. 10 depicts a detail exploded view of a spring plate, mounting system, and portion of the aft frame assembly of a transition duct in accordance with an embodiment of the present invention.
Figure 11:
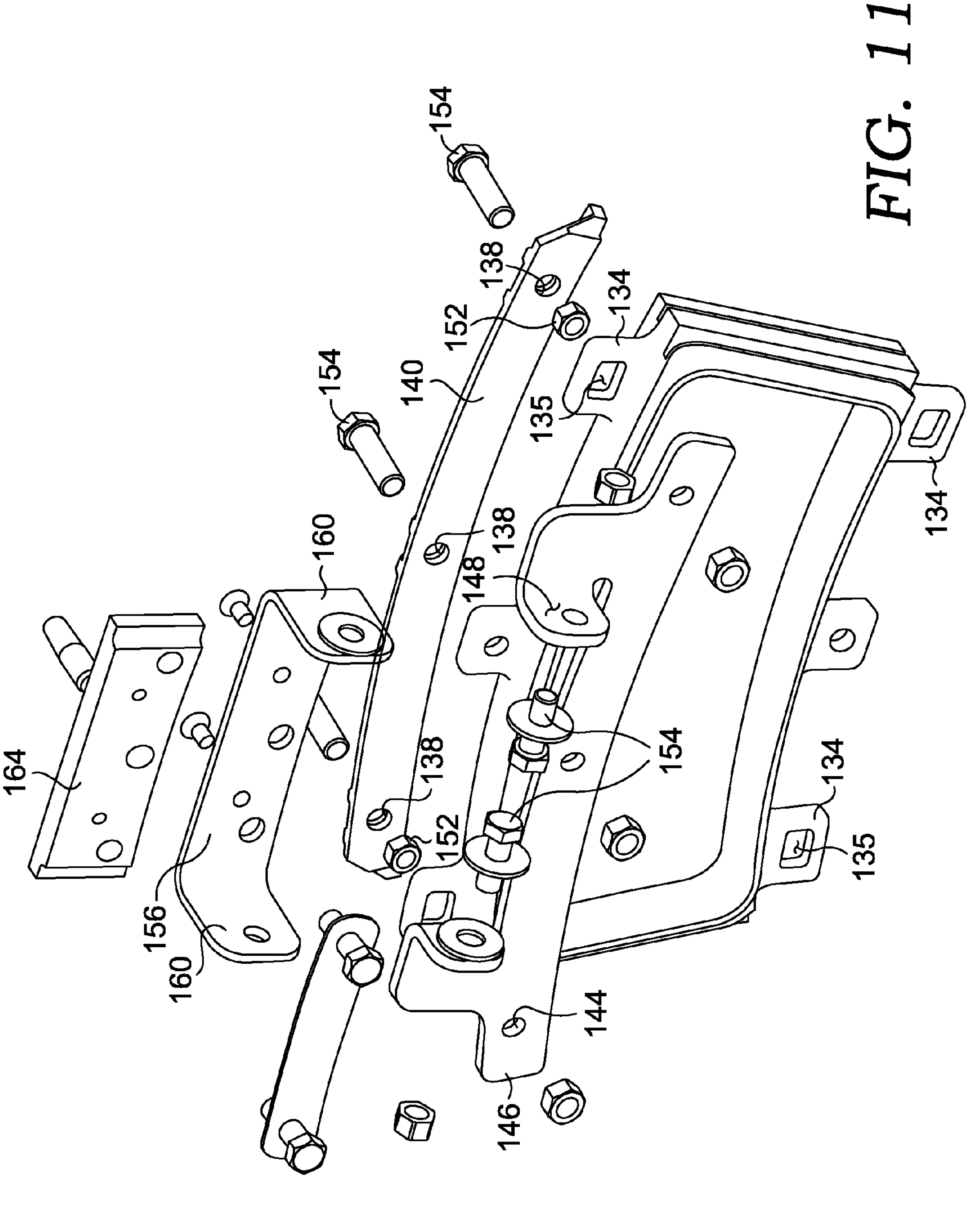
FIG. 11 depicts an exploded view of the mounting system and spring plate of a transition duct in accordance with an embodiment of the present invention.
Figure 12:
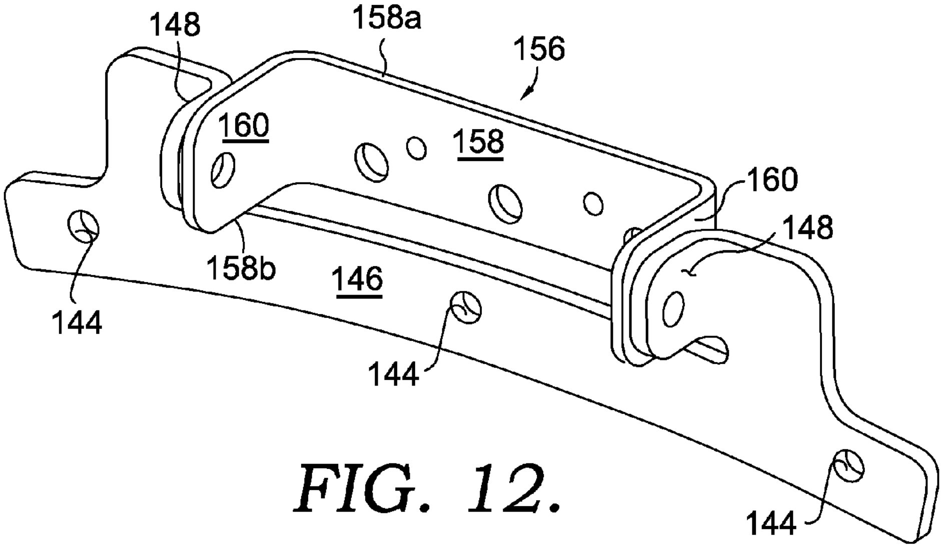
FIG. 12 depicts a perspective view of the spring plate and portion of the bulkhead assembly of a transition duct in accordance with an embodiment of the present invention; and, FIGS. 13A and 13B depict top and front elevation of views of the spring plate and portion of the bulkhead assembly of a transition duct in accordance with an embodiment of the present invention.
Figure 13A:
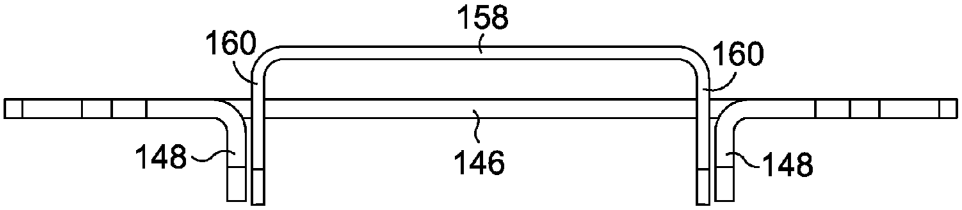
Figure 13B:
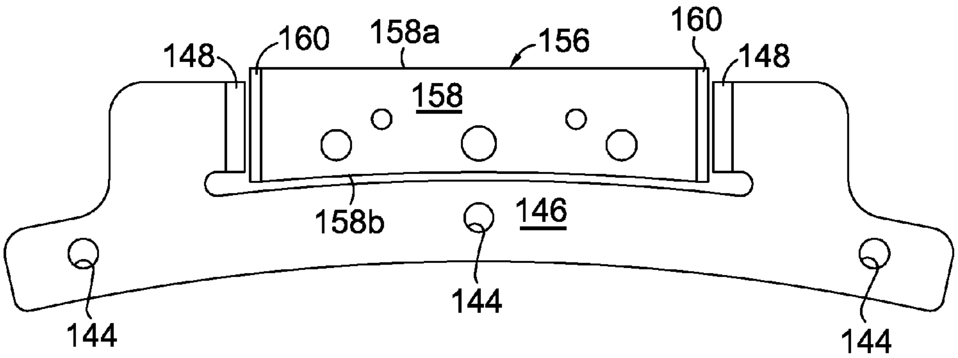

Referring now to FIGS. 3, 6, and 9, a generally rectangular aft frame 132 is fixed to the exit end 124 and has a plurality of retention lugs 134 located along the aft frame 132, proximate the arcs 126. The retention lugs 134, each have a second thickness and contain a slot 135 having a first circumferential length and a first radial width. For the embodiment shown in FIG. 9, there are four outermost retention lugs 134 each having a slot 135, which are located proximate ends of the arcs 126.

The present invention also comprises inner and outer bulkhead assemblies, which are shown in an exploded view state in FIG. 9. A first inner and generally arc-shaped bulkhead 136 has a plurality of first through holes 138 and a first outer and generally arc-shaped bulkhead 140 also has a plurality of first through holes 138. The inner and outer bulkhead assemblies also comprise a second inner and generally arc-shaped bulkhead 142 having a plurality of second through holes 144 and a second outer and generally arc-shaped bulkhead 146 that also has a plurality of second through holes 144. The second outer bulkhead 146 further comprises, in the embodiment shown in FIG. 9, two attachment portions 148 that extend radially outward and have a portion that is generally perpendicular to the second outer bulkhead 146. The attachment portions 148 also have a through hole 150 that, due to the orientation of the attachment portions 148, is oriented generally perpendicular to the plurality of second holes 144.

A plurality of bushings 152 are sized so as to fit generally within the slots 135 of the retention lugs 134. Each of the bushings 152 has a second axial length, a second circumferential length, a second radial length, and a third through hole. The inner bulkheads 136 and 142 are fastened to the retention lugs 134 and bushings 152 by a plurality of fasteners 154. Specifically, a fastener 154 passes through the first and second holes, 138 and 144, of the inner bulkheads 136 and 142. Also, the fasteners 154 pass through the first and second holes, 138 and 144, of the outer bulkheads 140 and 146 and through the bushings 152 in the retention lugs 134. The fasteners 154 can be a variety of locking means. For the embodiment of the present invention, one form of fasteners 154 used is a threaded bolt and nut arrangement.

The transition duct 100 also comprises a leaf spring or spring plate 156 that is coupled to the second outer bulkhead 146. The spring plate 156 has a flat portion 158 and one or more curved portions 160 that extend a distance so as to be adjacent to the attachment portions 148 of the second outer bulkhead 146. The one or more curved portions 160 of the spring plate 156 also include holes 162. The spring plate 156 is fixed to the attachment portions 148 of the second outer bulkhead 146 by a plurality of fasteners 154.

Figure 7:
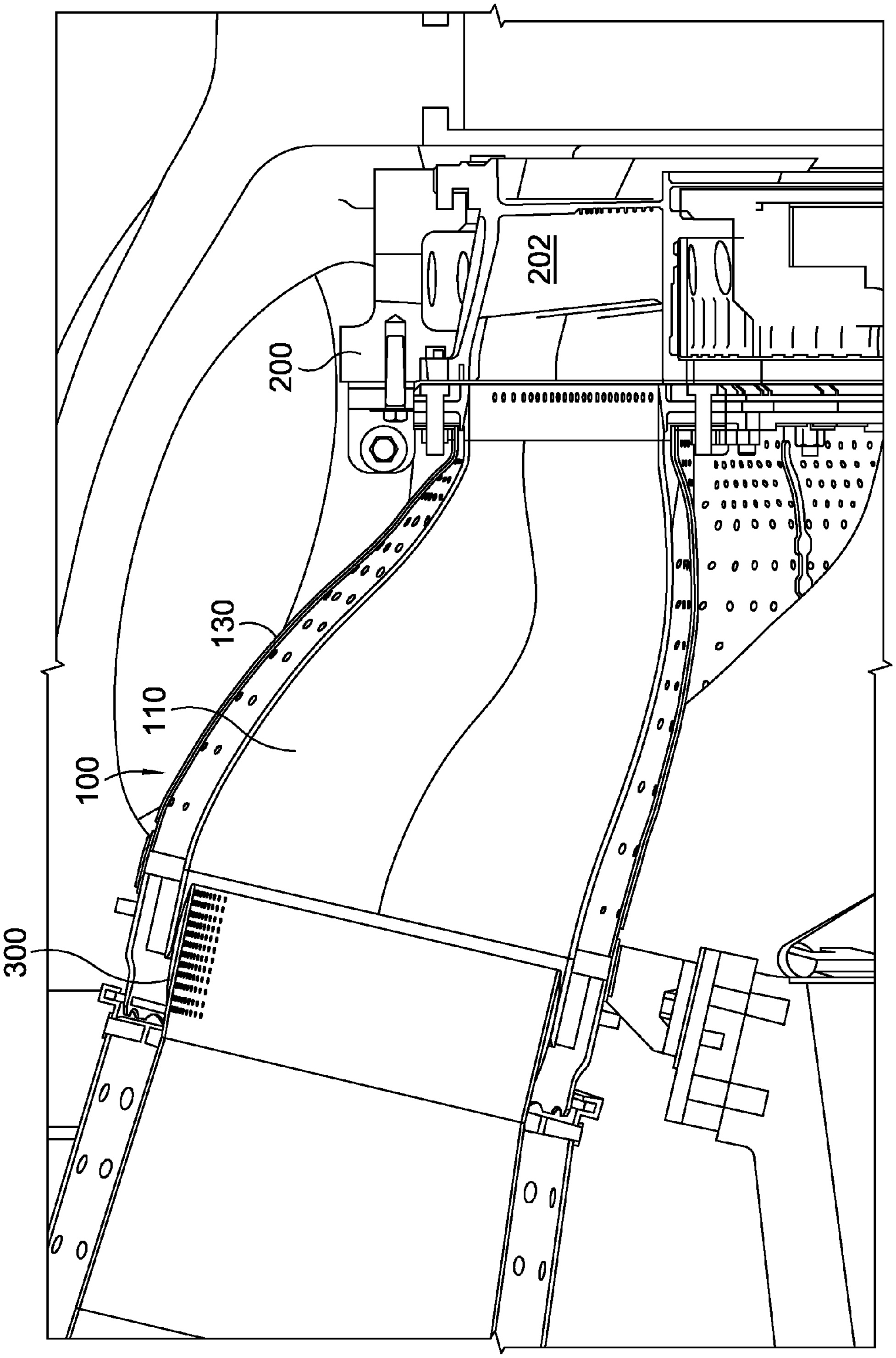
FIG. 7 depicts a cross section view of a portion of a gas turbine engine in which a transition duct in accordance with an embodiment of the present invention is installed.
Figure 8:
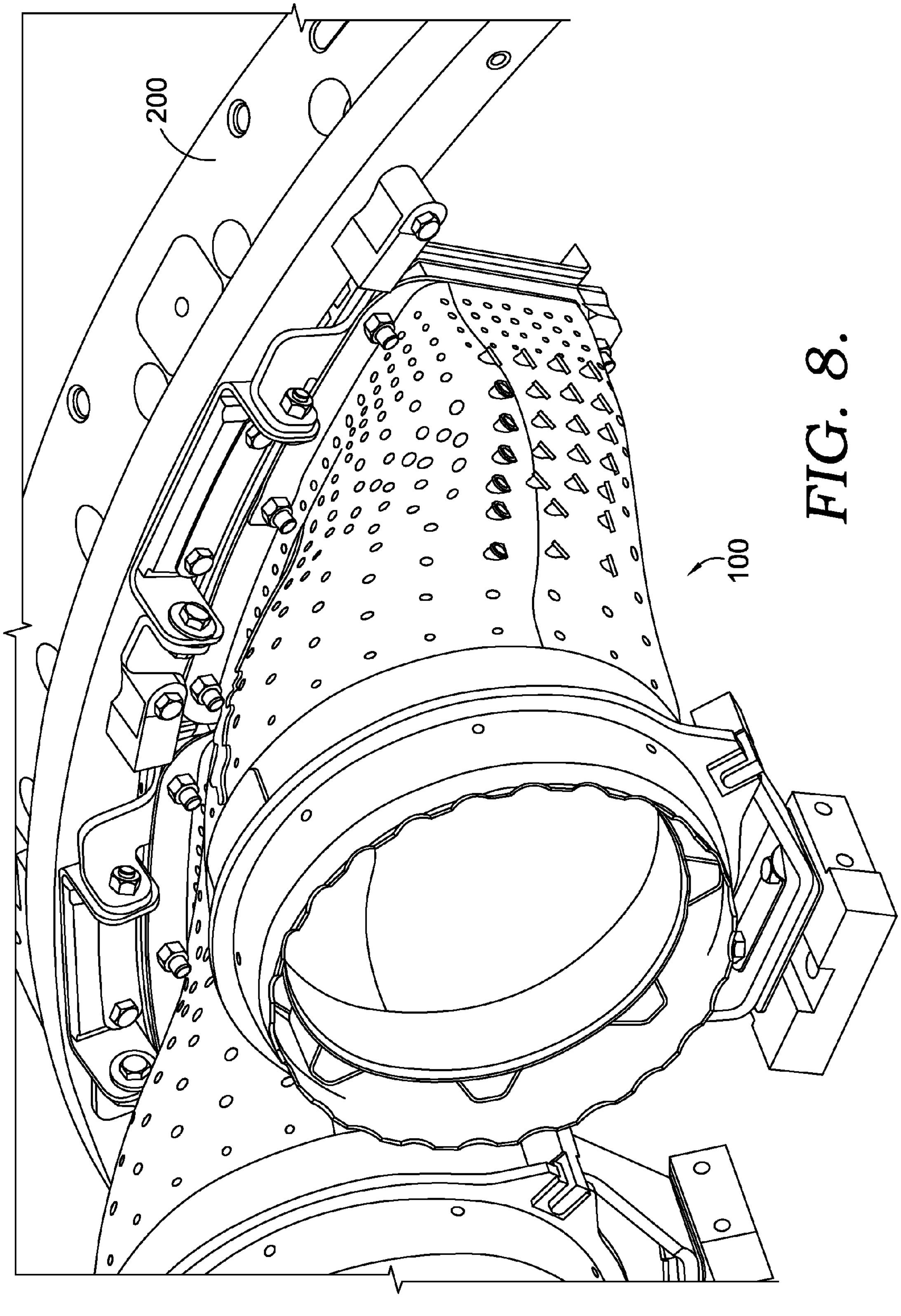
FIG. 8 depicts a perspective view of a portion of a gas turbine engine in which a transition duct in accordance with an embodiment of the present invention is installed.

An aft mounting bracket 164 is used to mount the transition duct 100 to a turbine vane ring 200 at the inlet of a turbine 202, as shown in FIGS. 7 and 8. The aft mounting bracket 164 has a pin that passes through an opening in the spring plate 156 and is placed into the turbine vane ring.

The spring plate 156 is incorporated into the transition duct 100 so as to be able to alter its natural frequency. A prior art embodiment of a transition duct without a spring plate 156 had a natural frequency of approximately 140 Hz for the inlet and aft frame region. The combustion acoustic tones generated by the combustor that is coupled to the transition duct 100, as shown in FIG. 7, operates in a range of approximately 120 Hz-145 Hz. As such, a natural frequency mode associated with the generally rectangular aft end 132, as known to those skilled in the art of vibratory analysis, couples with an inlet ovalization mode, producing a transition duct natural frequency of approximately 140 Hz, which is within the range of combustor acoustic tones. Excessive wear and fatigue of has been known to occur in this embodiment of the transition duct that operates at or near the combustor frequency range due to resonance. When a spring plate, an end frame, and the mounting system, are incorporated into the transition duct 100, as discussed in the present invention, the natural frequency for the mode described above is lowered to under approximately 100 Hz for the aft end modes, well outside of the natural frequency of the combustor. By using the spring plate 156, the modes present in the aft frame and inlet (inlet ovalization) can be decoupled. Where the spring plate causes the frequency at the aft end to decrease, it raises the frequency at the inlet end from approximately 140 Hz to approximately 160 Hz. In this embodiment, by incorporating a spring plate 156 the natural frequency of the aft frame was lowered, while the natural frequency of the inlet was raised. The spring plate 156 used in this embodiment of the present invention is but one example of a style and size of a leaf spring. The thickness and mounting arrangement of the leaf spring can vary depending upon the transition duct geometry and desired shift in frequency level for the transition duct.

Due to the configuration of the retention lugs 134 of the aft frame 132, the inner and outer bulkheads 136, 140, 142, and 146 are secured to the aft frame 132 of the transition duct 100 in such a way that the aft frame 132 can expand thermally so as to minimize any thermal and/or mechanical stresses in the frame. That is, by the retention lugs 134 having elongated slots 135, the transition duct 100 can expand in a generally circumferential direction, i.e. along the arcs 126 so as to dissipate any stress that accumulates in the aft frame region during operation.

In operation, the transition duct 100 is surrounded by a cooling fluid, such as air, that is supplied by the compressor. As previously discussed, the transition duct 100 contains hot combustion gases that are directed from the combustor to the turbine. However, these hot combustion gases are at a lower pressure than the surrounding air. As such, the aft frame 132 and transition duct 100 are exposed to a compressive pressure load by the surrounding air. In order to ensure that the aft frame 132 does not buckle or collapse under such applied pressure loads, sidewalls of the aft frame 132 that run along the radial lines 128 as well as the inner and outer bulkheads 136, 140, 142, and 146 have a sufficient thickness to counteract this applied load and provide the necessary structural stiffness to prevent the aft frame 132 from collapsing under the applied pressure.

As previously discussed, an embodiment of the present invention incorporates a second panel assembly 130 that surrounds the first panel assembly 110. The second panel assembly 130 comprises a first outer panel 170 and a second outer panel 172 that are fixed together along a plurality of generally axial seams. The second panel assembly 130 also includes a plurality of cooling holes 174 and plurality of cooling tubes 176. The second panel assembly 130 is positioned so as to provide dedicated cooling to the first panel assembly 110 of the transition duct 100. A cooling fluid, such as air, is passed through the cooling holes 174 and/or the cooling tubes 176 and impinges on the first outer surface 118 of the first panel assembly 110.

The process by which the natural frequency of the transition duct 100 is determined and the size of the spring plate 156 is identified depends on a number of factors. Once the transition duct is assembled, except for the aft mounting bracket 164, the transition duct 100 is ping-tested to determine the natural frequencies of the transition duct. This test data is compared to other test data and analytical models for at least the combustion system of the particular engine in which the transition duct will be installed to determine where potential overlaps in frequencies will occur. Based on these comparisons, a thickness for the spring plate 156 can be determined. The spring plate, having the desired thickness, is then installed on the transition duct, and the transition duct can be installed in the engine.

It should be understood that the terms "axial", "radial", and "circumferential", as used herein, generally are provided with reference to the turbine 200 (e.g., a theoretical turbine) connected with the transition duct 100. Accordingly, "axial" generally means with reference to an axis identical to (or parallel with) an axis of the turbine 200, "radial" generally means along a radius extending from a center rotational axis of the turbine 200, and "circumferential" generally means along a circumference of a circular frame of the turbine 200 with which a plurality of ducts 100 are mounted. Further, the terms "fastener", "bolt", "pin" are used interchangeably herein to denote a component for mechanically coupling adjacent structures together (e.g., through a threaded interconnection, an interference fit, etc).

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A transition duct comprising:

a first panel assembly;

a generally rectangular aft frame fixed to an exit end of the first panel assembly;

an inner and outer bulkhead assembly comprising:

a first inner and first outer, generally arc-shaped bulkhead having a plurality of first through holes;

a second inner and second outer, generally arc-shaped bulkhead having a plurality of second through holes;

a plurality of bushings;

means for fastening the bulkheads and bushings to the aft frame;

a spring plate capable of being received between attachment portions of the second outer bulkhead, the spring plate having a flat portion extending from a top edge to a bottom edge and merging into parallel curved portions that are perpendicular to the flat portion and immediately adjacent to the attachment portions of the second outer bulkhead;

an aft mounting bracket for mounting the transition duct to a portion of a turbine frame, the aft mounting bracket coupled to at least the spring plate;

wherein the aft frame, the inner and outer bulkhead assemblies, the spring plate, and the aft mounting bracket are secured in a manner so as to allow for thermal expansion of the aft frame in at least a circumferential direction while permitting a natural frequency of the transition duct to be altered.

2. The transition duct of claim 1 further comprising a second panel assembly positioned radially outward of the first panel assembly.

3. The transition duct of claim 2, wherein the second panel assembly further comprises a plurality of cooling holes, wherein a portion of the cooling holes also have cooling tubes located therein.

4. The transition duct of claim 1, wherein the first panel assembly comprises a first inner panel that is fixed to a second inner panel so as to form a duct having a first inner surface, a first outer surface, and a first thickness therebetween, the duct having a generally cylindrical inlet end and a generally rectangular exit end.

5. The transition duct of claim 1, wherein the generally rectangular aft frame further comprises a plurality of retention lugs with each of the retention lugs having a slot with a first circumferential length and a first radial width.

6. The transition duct of claim 5, wherein the plurality of bushings are positioned within the slot of the retention lug.

7. The transition duct of claim 6, wherein the means for fastening the bulkheads and bushings to the retention lugs of the aft frame is a bolt, screw, or other type of removable fastener.

8. The transition duct of claim 1, wherein placement of the spring plate proximate the second outer bulkhead alters a natural frequency of the transition duct assembly by up to 20 Hz.

9. The transition duct of claim 1, wherein the second outer bulkhead further comprises a through-hole so as to permit yaw movement of the transition duct assembly.

10. A mounting system for a transition duct capable of altering a natural frequency of the transition duct, the mounting system comprising:

an outer bulkhead assembly having a first outer bulkhead and a second outer bulkhead, the second outer bulkhead having attachment portions that extend radially outward and generally perpendicular to the second outer bulkhead;

a spring plate capable of being received by the second outer bulkhead, the spring plate having a flat portion extending from a top edge to a bottom edge and merging into parallel curved portions that are perpendicular to the flat portion and extend so as to be immediately adjacent to the attachment portions of the second outer bulkhead; and, an aft mounting bracket for mounting the transition duct to a portion of a turbine frame;

wherein the outer bulkhead assembly, the spring plate, and the aft mounting bracket are secured in a manner so as to alter the natural frequency of the transition duct.

11. The mounting system of claim 10, wherein use of the spring plate alters the natural frequency of the transition duct to a region outside of dynamic excitation with a gas turbine engine or a combustion system in which the transition duct is located in or coupled thereto.

12. The mounting system of claim 10, wherein the first outer bulkhead has a plurality of first through holes.

13. The mounting system of claim 10, wherein the attachment portions also have a through hole oriented generally perpendicular to a plurality of second through holes in the second outer bulkhead.

14. The mounting system of claim 10, wherein the aft mounting bracket is coupled to at least the spring plate.

* * * * *